(12) United States Patent
Zhang et al.

(10) Patent No.: US 11,766,704 B2
(45) Date of Patent: Sep. 26, 2023

(54) SEA CREATURE CLEANING ROBOT FOR INTAKE TUNNEL FOR NUCLEAR POWER PLANT

(71) Applicant: CHENGDU UNIVERSITY OF INFORMATION TECHNOLOGY, Chengdu (CN)

(72) Inventors: Gexiang Zhang, Chengdu (CN); Qiang Yang, Chengdu (CN); Ming Zhu, Chengdu (CN); Qiyu Liu, Chengdu (CN); Qiang Yang, Chengdu (CN); Xiaohong He, Chengdu (CN); Minyao Tan, Chengdu (CN); Li Yang, Chengdu (CN); Jun Liu, Chengdu (CN); Zhenyu Wang, Chengdu (CN); Dapeng Zhang, Chengdu (CN); Jiawei Wang, Chengdu (CN); Xiang Chen, Chengdu (CN); Xiaozhao Jin, Chengdu (CN)

(73) Assignee: CHENGDU UNIVERSITY OF INFORMATION TECHNOLOGY, Chengdu (CN)

( * ) Notice: Subject to any disclaimer, the term of this patent is extended or adjusted under 35 U.S.C. 154(b) by 0 days.

(21) Appl. No.: 17/913,443

(22) PCT Filed: Apr. 4, 2020

(86) PCT No.: PCT/CN2020/083390
§ 371 (c)(1),
(2) Date: Sep. 22, 2022

(87) PCT Pub. No.: WO2021/189527
PCT Pub. Date: Sep. 30, 2021

(65) Prior Publication Data
US 2023/0122479 A1   Apr. 20, 2023

(30) Foreign Application Priority Data
Mar. 22, 2020 (CN) .......................... 202010206492.5

(51) Int. Cl.
*B08B 9/049* (2006.01)
*G21C 17/017* (2006.01)

(52) U.S. Cl.
CPC ............ *B08B 9/049* (2013.01); *G21C 17/017* (2013.01)

(58) Field of Classification Search
CPC ............ B02C 18/0076; B02C 18/0084; B02C 18/0092; E02F 5/282; E02F 5/285
See application file for complete search history.

(56) References Cited

U.S. PATENT DOCUMENTS

| 3,230,668 A | * | 1/1966 | Stanley | ................... B08B 9/051 451/344 |
| 3,525,111 A | * | 8/1970 | Von Arx | ................. F16L 55/38 15/104.061 |

(Continued)

FOREIGN PATENT DOCUMENTS

| CN | 207463754 U | 6/2018 |
| CN | 109570158 A | 4/2019 |

(Continued)

OTHER PUBLICATIONS

JPH8164373A English Translation (Year: 1996).*

*Primary Examiner* — Eric J Rosen
*Assistant Examiner* — Makena S Markman
(74) *Attorney, Agent, or Firm* — Bayramoglu Law Offices LLC

(57) ABSTRACT

A sea creature cleaning robot for an intake tunnel for a nuclear power plant includes a frame, cutter assemblies, and walking wheel assemblies; the frame is used for mounting and fixing cutter mounting seats and crawler wheels; the walking wheel assemblies mounted on the frame enable the entire device to normally walk in a tunnel; the cutter assemblies control the height of cutters by means of hydraulic cylinders to make the cutters contact the inner wall of the (Continued)

tunnel, and the hydraulic cylinders drive the saw-toothed cutters to move back and forth to remove sea creatures attached to the inner wall of the tunnel; the cutter assemblies are uniformly distributed on the frame, so as to ensure full coverage of the cleaning range of the cross section of the tunnel. The robot can clean sea creatures in tunnels in place of manual work to significantly improve the cleaning efficiency.

6 Claims, 3 Drawing Sheets

(56) References Cited

U.S. PATENT DOCUMENTS

| | | | | |
|---|---|---|---|---|
| 3,604,042 | A | * 9/1971 | Bremner | B08B 9/045 |
| | | | | 15/104.31 |
| 4,920,600 | A | 5/1990 | Reinhart | |
| 2003/0039752 | A1 | * 2/2003 | Winiewicz | B05B 13/0636 |
| | | | | 427/427.2 |

FOREIGN PATENT DOCUMENTS

| | | | | |
|---|---|---|---|---|
| CN | 209243805 | U | | 8/2019 |
| CN | 110539810 | A | | 12/2019 |
| CN | 110701429 | A | | 1/2020 |
| CN | 210023119 | U | | 2/2020 |
| JP | H8164373 | A | * | 6/1996 |
| JP | H08164373 | A | | 6/1996 |

* cited by examiner

SEA CREATURE CLEANING ROBOT FOR INTAKE TUNNEL FOR NUCLEAR POWER PLANT

CROSS REFERENCE TO THE RELATED APPLICATIONS

This application is the national phase entry of International Application No. PCT/CN2020/083390, filed on Apr. 4, 2020, which is based upon and claims priority to Chinese Patent Application No. 202010206492.5, filed on Mar. 22, 2020, the entire contents of which are incorporated herein by reference.

TECHNICAL FIELD

The present invention relates to a cleaning robot, and more particularly to a sea creature cleaning robot for an intake tunnel for a nuclear power plant.

BACKGROUND

Domestic coastal nuclear power plants mostly build intake tunnels at offshore water intakes to take in sea water as final cooling water. In recent years, for various reasons, lots of cold source water intake blockage events occurred in the nuclear power plants during water diversion. The main reason why the water intake is blocked is the invasion of foreign matters, in most cases, the blockage of aquatic organisms. Coastal nuclear power plants use sea water as cooling water. In order to obtain relatively pure sea water, the sea water needs to be led to a reservoir by means of a tunnel with a certain diameter, and is then further treated. In the long-term water diversion process, some sea creatures pass through a tunnel entrance, attach on a wall of the tunnel, and propagate in large quantities. Furthermore, some sea creatures produce a large number of acid substances during propagation and metabolism. The acid substances erode concrete surfaces, such that the thickness of a concrete protection layer is reduced, thereby providing convenience for chloride ions, sulfate and the like in the sea water to enter the concrete, causing reinforcement corrosion, and damaging the concrete structure of the intake tunnel. The microorganisms contact the reinforcement, and the acid substances secreted during metabolism corrode and rust the reinforcement. The damage of the concrete structure and the reduction of elastic modulus have a certain threat to the safety of the concrete structure.

At present, sea creatures in the intake tunnel of a nuclear power plant are generally manually cleaned. That is, a worker holds a shovel with hands to remove the sea creatures. However, such mode has a low cleaning efficiency, and has a high requirement for the physical strength for the worker. Furthermore, the worker staying in the intake tunnel for a long time has various dangers, such as insufficient oxygen, toxic gas released by the sea creatures and the like, thereby causing great potential safety hazard to the personal safety of the worker.

In recent years, developed countries such as Germany, Switzerland, France and the like developed a series of products for highway tunnel or subway tunnel cleaning. However, most of the products use a high pressure water gun for washing, and the cleaned objects are generally the impurities attached on an inner wall of the tunnel, such as dust and the like. With regard to the sea creature cleaning device for an intake tunnel for a nuclear power plant used in these special scenarios, Xuzhou Construction Machinery Group successfully developed the first sea creature cleaning device in China, a robot named "TCR7500". The robot is an unmanned "V"-shaped device capable of automatically waving. Although the robot solves the current sea creature cleaning problem to a certain extent, the cleaning efficiency thereof is low.

SUMMARY

The present invention provides a sea creature cleaning robot for an intake tunnel for a nuclear power plant which is used to efficiently remove sea creatures in an intake tunnel of a nuclear power plant.

In order to solve the above technical problems, the technical solution used by the present invention is:

A sea creature cleaning robot for an intake tunnel for a nuclear power plant, including an annular frame with a diameter less than a diameter of a tunnel concrete pipe to be cleaned, a plurality of cutter assemblies capable of moving up and down in the radial direction of the frame and detachably and uniformly mounted on an outer circumferential surface of the frame, and a plurality of walking wheel assemblies detachably and uniformly mounted at a lower part of the frame.

As a further solution of the above technical solution, at least two walking wheel assemblies are detachably mounted at an upper part of the frame. As a further solution of the above technical solution, the quantity of the frames is at least two; the cutter assemblies and the walking wheel assemblies are disposed in the same way on the frames; two adjacent frames are coaxially disposed and are detachably connected together; and the cutter assemblies on two adjacent frames are staggered.

As a further solution of the above technical solution, the cutter assembly includes a frame connecting plate, a cutter mounting plate, and a cutter; the frame connecting plate is connected to the outer circumferential surface of the frame; the cutter mounting plate and the frame connecting plate are disposed in parallel and are movably connected by means of a plurality of connecting rods; two ends of a lifting hydraulic cylinder are respectively connected to the cutter mounting plate and the frame connecting plate; and the cutter is mounted on one side of the cutter mounting plate distal from the frame connecting plate.

As a further solution of the above technical solution, a guide rail is connected on one side of the cutter mounting plate distal from the frame connecting plate; a slide block capable of sliding on the guide rail is connected on one side of the cutter; and one end of the cutter distal from a cutting edge is connected to the cutter mounting plate by means of a telescopic hydraulic cylinder.

As a further solution of the above technical solution, the walking wheel assembly includes a crawler wheel mounting seat, a motor, and a crawler wheel; the crawler wheel mounting seat is connected to an inner circumferential surface of the frame by means of a crawler wheel connecting plate; and a motor mounting seat is connected to the crawler wheel mounting seat; the motor is mounted at the bottom of the motor mounting seat; and a rotary shaft of the motor is disposed perpendicular to the axial direction and the radial direction of the frame simultaneously, and directly drives the crawler wheel.

As a further solution of the above technical solution, the quantity of the motors at the bottom of the motor mounting seat is two; and the two motors are disposed back to back, and respectively drive one crawler wheel.

As a further solution of the above technical solution, the motor mounting seat and the crawler wheel mounting seat are connected by means of a cushion cylinder; a guide block disposed in parallel with an extension and retraction direction of the cushion cylinder is mounted on an inner wall of the crawler wheel mounting seat; and a guide groove for use in cooperation with the guide block is mounted on an outer wall of the motor.

As a further solution of the above technical solution, the frame includes a plurality of arc-shaped frame sub-modules sequentially assembled and connected together to form an annular structure.

As a further solution of the above technical solution, a cutting edge end of the cutter is saw-toothed; and the cutting edge end slantwise extends out in a direction distal from the cutter mounting plate.

Compared with the prior art, the beneficial effects of the invention are: the robot can clean sea creatures in tunnels in place of manual work, and can clean all the sea creatures attached on the entire surface of the tunnel concrete pipe in one time, and can effectively avoid the risk generated when the worker enters the tunnel for operation; furthermore, the present invention improves the cleaning efficiency, and reduces the cleaning time.

Reference numbers in the accompanying drawings are as follows: 1, cutter assembly; 2, walking wheel assembly; 3, annular pressing plate; 4, crawler wheel connecting plate; 5, nut; 6, bolt; 7, frame; 101, frame connecting plate; 102, first pin shaft; 103, second pin shaft; 104, lifting hydraulic cylinder; 105, connecting rod; 106, cutter mounting plate; 107, slide block; 108, cutter; 109, guide rail; 110, telescopic hydraulic cylinder; 111, connecting block; 112, third pin shaft; 201, motor; 202, crawler wheel mounting plate; 203, adjustable crawler wheel; 204, auxiliary crawler wheel; 205, support shaft; 206, power wheel; 207, crawler belt; 208, motor mounting seat; 209, guide block; 210, crawler wheel mounting seat; 211, cushion cylinder; 71, frame sub-module; 72, steel pipe; 73, fastening bolt; 74, fastening nut; 8, tunnel concrete pipe.

DETAILED DESCRIPTION OF THE EMBODIMENTS

The preferred embodiments of the present invention will be described in detail hereafter with reference to the accompanying drawings, such that the concept of the present invention, the technical problem to be solved, the technical features forming the technical solution, and the achieved technical effects can be further understood. However, it should be noted that the descriptions of the embodiments are exemplary only, but not intended to limit the present invention.

Figure 1:
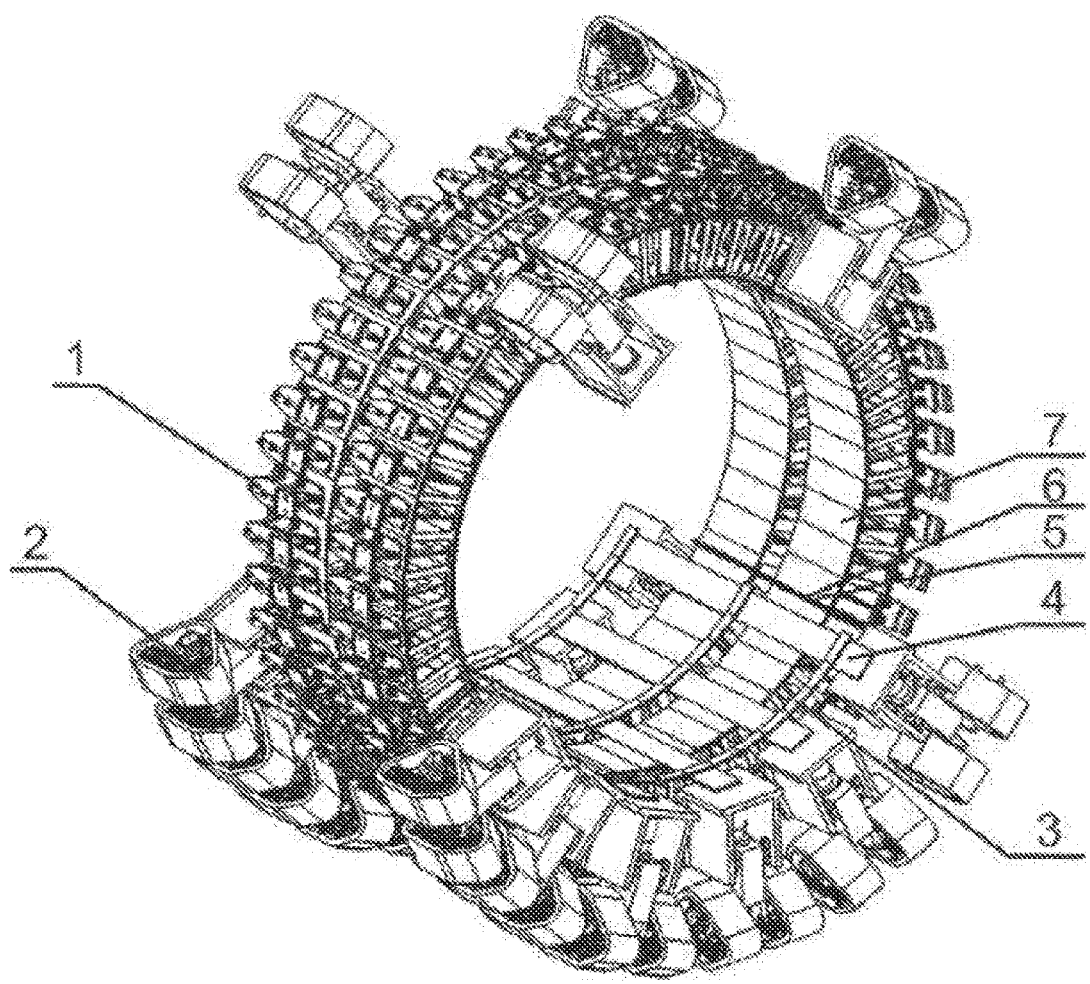
FIG. 1 is a schematic view of an overall structure of the present invention.

As shown in FIG. 1, the present invention includes a frame 7, cutter assemblies 1, and walking wheel assemblies 2.

Figure 4:
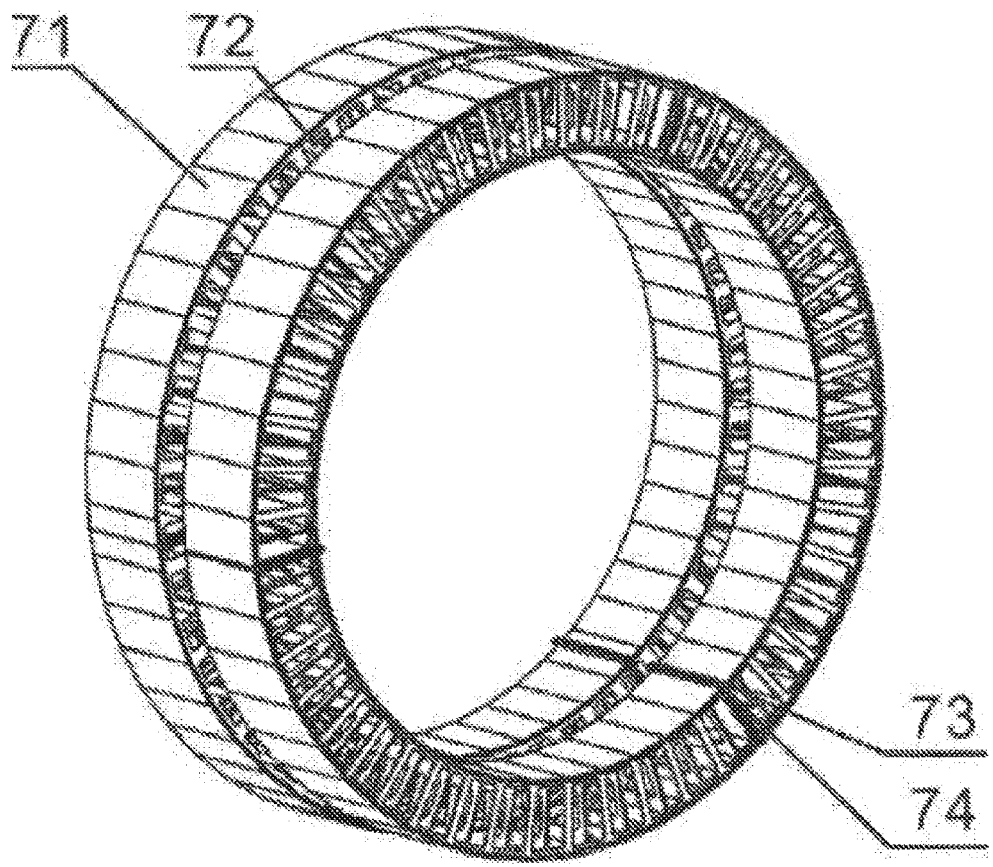
FIG. 4 is a structural schematic view of a frame according to the present invention.

As shown in FIG. 4, the frame 7 includes a plurality of arc-shaped frame sub-modules 71 sequentially assembled and connected together to form an annular structure. In the present embodiment, the frame includes three frame sub-modules 71 sequentially connected end to end by means of a fastening bolt 73 and a fastening nut 74. The frame 7 uses a modularized design, facilitating the transportation and mounting in a tunnel concrete pipe 8.

Figure 2:
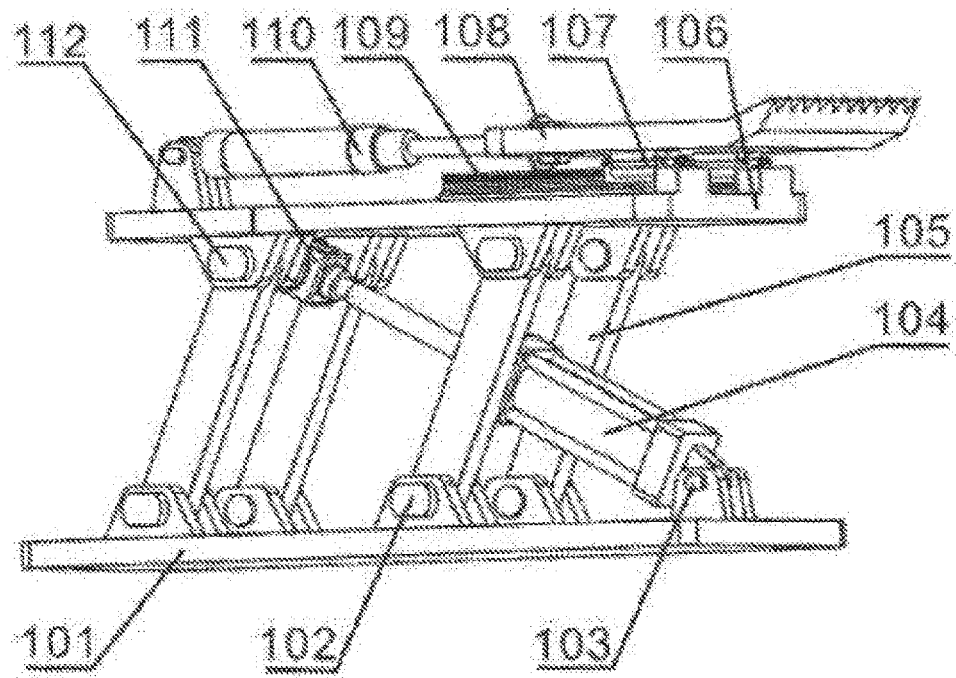
FIG. 2 is a structural schematic view of a cutter assembly according to the present invention.

As shown in FIG. 2, the cutter assembly 1 comprises a frame connecting plate 101, a cutter mounting plate 106, and a cutter 108. The frame connecting plate 101 is connected to an outer circumferential surface of the frame 7 by means of a bolt. Four pin seats are uniformly welded on one side of the frame connecting plate 101 opposite to the cutter mounting plate. Four connecting rods 105 with equal length are connected to the four pin seats in a one-to-one correspondence manner. Specifically, one end of the connecting rod 105 is movably connected to the pin seat of the frame connecting plate 101 by means of a first pin shaft 102, and the other end of the connecting rod 105 is movably connected to the pin seat of the cutter mounting plate 106 by means of a third pin shaft 112, such that the cutter mounting plate 106 and the frame connecting plate 101 are disposed in parallel all the time. The cutter 108 is mounted on one side of the cutter mounting plate 106 distal from the frame connecting plate 101. A lifting hydraulic cylinder 104 is diagonally disposed between the cutter mounting plate 106 and the frame connecting plate 101. A fixed end of the lifting hydraulic cylinder 104 is movably connected to the pin seat of the frame connecting plate 101 by means of a second pin shaft 103, and a movable end of the lifting hydraulic cylinder 104 is connected to a connecting block 111. The connecting block 111 is movably connected to the pin seat of the cutter mounting plate 106 by means of a pin shaft. The lifting hydraulic cylinder 104 is used to control the lifting of the cutter 108 on the cutter mounting plate 106, such that the cutter 108 can move up and down in the radial direction of the frame 7. The cutter assemblies 1 are uniformly mounted on the outer circumferential surface of the frame 7, ensuring full coverage of the cleaning range of the cross section of the tunnel. The lifting hydraulic cylinders 104 of all the cutter assemblies 1 operate synchronously, extend or retract at the same time, and keep working rhythms consistent.

In order to further improve the cleaning effect, a guide rail 109 is connected on one side of the cutter mounting plate 106 distal from the frame connecting plate 101; and a slide block 107 capable of sliding on the guide rail 109 is connected on one side of the cutter 108. One end of the cutter 108 distal from a cutting edge is connected to a movable end of a telescopic hydraulic cylinder 110. A fixed end of the telescopic hydraulic cylinder 110 is connected, by means of a pin shaft, to a pin seat welded on one end of the cutter mounting plate 106 distal from the cutter 108. The telescopic hydraulic cylinder 110 allows the cutter 108 to repeatedly extend and retract in the axial direction of the frame 7, ensuring that the stubborn sea creatures attached on an inner wall of the tunnel concrete pipe 8 can be removed.

A cutting edge end of the cutter 108 is saw-toothed, and slantwise extends out in a direction distal from the cutter mounting plate 106, such that the cleaning effect of the cutter 108 is further improved.

Figure 3:
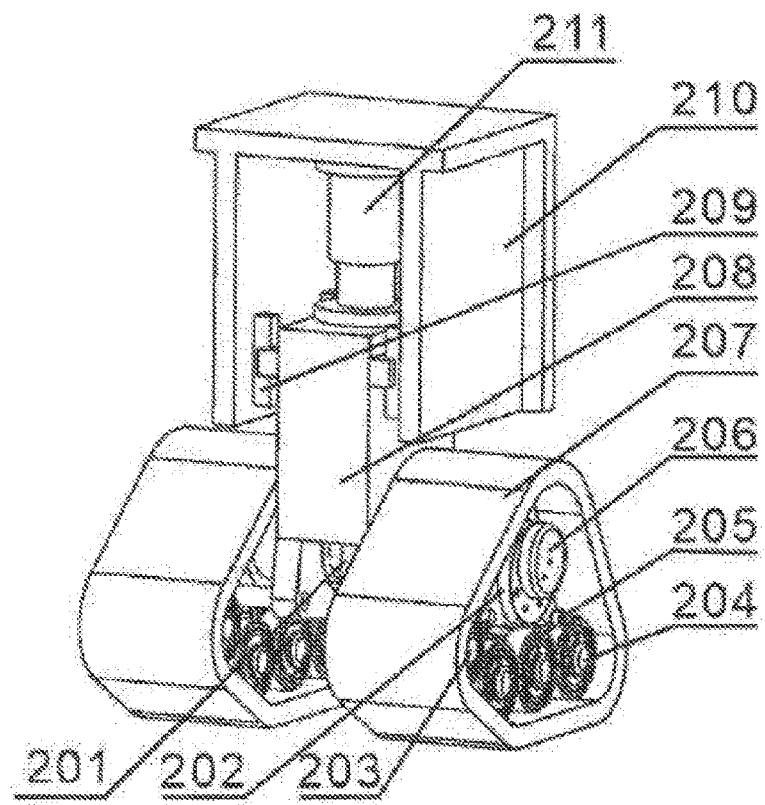
FIG. 3 is a structural schematic view of a walking wheel assembly according to the present invention.

As shown in FIG. 3, the walking wheel assembly 2 includes a crawler wheel mounting seat 210, a motor 201, and a crawler wheel. In the present embodiment, six walking wheel assemblies 2 are mounted at a lower part of the frame 7, enabling the entire device to normally walk in the tunnel. The specific quantity of walking wheel assemblies 2 can be set according to practical situations. The walking wheel assemblies 2 are connected by means of an annular pressing plate 3, so as to improve the structural rigidity.

The crawler wheel mounting seat 210 is connected to an inner circumferential surface of the frame 7 by means of a crawler wheel connecting plate 4. The motor mounting seat 208 is connected to the crawler wheel mounting seat 210; the motor 201 is mounted at the bottom of the motor mounting seat 208; and a rotary shaft of the motor 201 is disposed perpendicular to the axial direction and the radial direction of the frame 7 simultaneously, and directly drives the crawler wheel. The crawler wheel used in the present embodiment is a conventional crawler wheel, and includes a crawler wheel mounting plate 202, an adjustable crawler wheel 203, an auxiliary crawler wheel 204, a support shaft 205, a power wheel 206, and a crawler belt 207. The rotary shaft of the motor 201 is directly connected to the power wheel 206, so as to drive the crawler wheel. The crawler wheel mounting plate 202 is used to better position and mount each crawler wheel. The support shaft 205 facilitates the enhancement of the structural strength of the entire crawler wheel. The adjustable crawler wheel 203 is used to adjust the tension and relaxation of the crawler belt 207. Three auxiliary crawler wheels 204 are arranged in a row, and are used to supply a large contact surface, such that the crawler belt 207 can be better adhered to an inner wall of the tunnel.

In order to further improve the walking stability, the quantity of the motors 201 at the bottom of the motor mounting seat 208 is two; and the two motors 201 are disposed back to back, and respectively drive one crawler wheel.

The motor mounting seat 208 and the crawler wheel mounting seat 210 are connected by means of a cushion cylinder 211; a guide block 209 disposed in parallel with an extension and retraction direction of the cushion cylinder 211 is mounted on an inner wall of the crawler wheel mounting seat 210; and a guide groove for use in cooperation with the guide block 209 is mounted on an outer wall of the motor 201. The guide block 209 has a guide effect when the cushion cylinder 211 operates, such that the device has cushion and guide effects under the action of gravity according to a preset condition.

Figure 5:
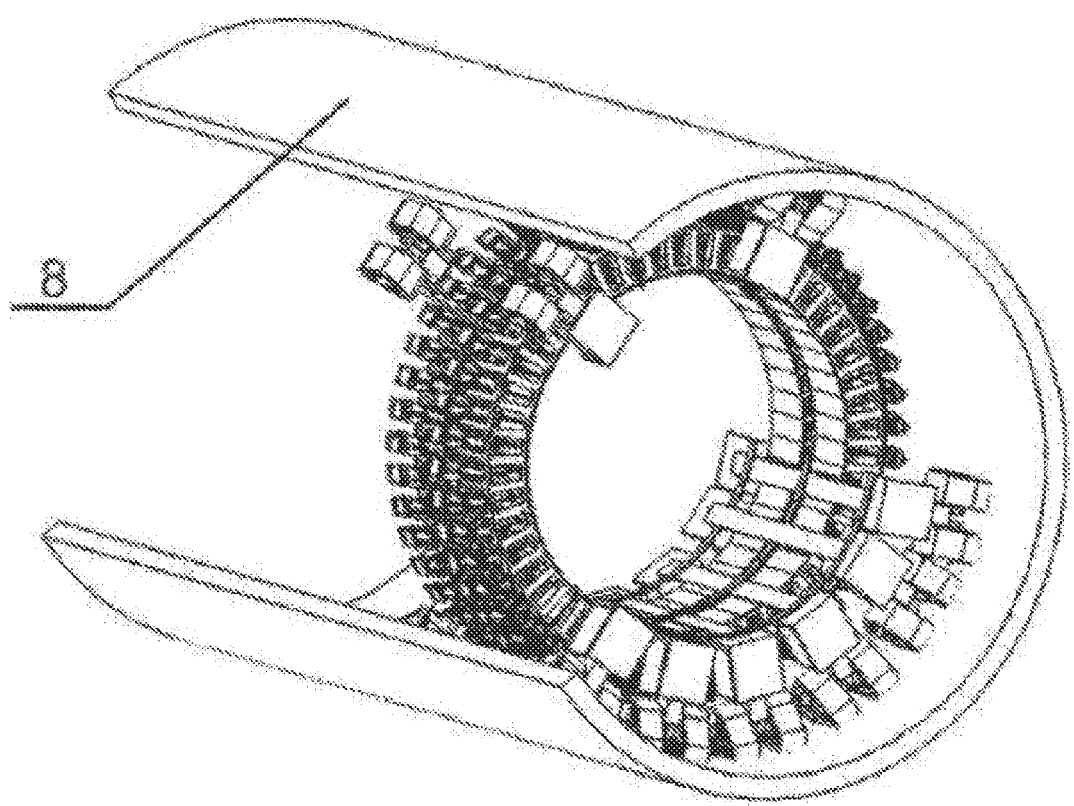
FIG. 5 is a schematic view when the present invention is operated in a concrete pipe of a tunnel.

As shown in FIG. 5, the components of the present invention are disassembled and transported to the tunnel concrete pipe 8 to be cleaned, and are then assembled and fixedly connected by means of a nut 5 and a bolt 6. In an initial state, the lifting hydraulic cylinder 104 is in a contracted state, and the physical dimension of the cutter assembly 1 is reduced, such that the entire device can smoothly enter the tunnel. When the robot start to operate, the lifting hydraulic cylinder 104 is in an extended state; the cutting edge end of the cutter 108 contacts the inner wall of the tunnel; and the walking wheel assembly 2 drives the entire device to move forward to remove the sea creatures attached on the inner wall of the tunnel. When the sea creatures are difficult to clean, the telescopic hydraulic cylinder 110 can repeatedly extend and retract, so as to drive the cutter 108 to repeatedly extend and retract in the axial direction of the frame 7, ensuring that the stubborn sea creatures attached on the inner wall of the tunnel concrete pipe 8 can be removed. After the cleaning, the lifting hydraulic cylinder 104 retracts; and the physical dimension of the cutter assembly 1 is reduced, such that the device can be smoothly moved out of the tunnel.

The frame 7, the cutter assembly 1, and the walking wheel assembly 2 form one cleaning unit. And a plurality of cleaning units can be configured to improve the cleaning effect. In the present embodiment, two cleaning units are provided, and the structures of the two cleaning units are exactly the same. Two adjacent frames 7 between the cleaning units are coaxially disposed and are detachably connected together by means of a steel pipe 72. The cutter assemblies 1 on the two adjacent frames 7 are staggered, so as to prevent a gap between the cutter assemblies 1 from missing cleaning, and increase a cut contact area between the cutter assemblies 1 and the inner wall of the tunnel, thereby improving the cleaning efficiency. The configuration of multiple cleaning units not only facilitates the improvement of the cleaning efficiency, but also improves fault tolerance. For example, the gap between the cutter assemblies 1 of the first cleaning unit is large, and therefore the first cleaning unit can be used to clean large objects; the gap between the cutter assemblies 1 of the second cleaning unit is small, and therefore the second cleaning unit can be used to clean small objects. The targeted cleaning can realize targeted cutting of the cutter 108 under the situation of ensuring gap complement; the functions of the cutter 108 are distinguished; and the cutter 108 is made from an appropriate material, thereby improving the durability of the cutter 108, and reducing the maintenance cost.

Two walking wheel assemblies 2 are additionally disposed at an upper part of each cleaning unit; the two walking wheel assemblies 2 are symmetrically disposed at an upper part of the frame 7, so as to assist to improve the walking stability of the entire device.

In the present invention, the components can complete operations under the control of an electric control portion. A worker can remotely monitor various actions of the robot in the tunnel by means of a host computer in a monitoring room. Various sensors mounted on the robot can provide in real time various parameter for the host computer in the monitoring room, ensuring the normal operation of the robot. The worker only needs to initialize the parameters of the robot and start the robot, then the robot can better complete a sea creature cleaning task in the tunnel according to a manually set control algorithm. In case of an emergency, the robot can automatically stop, feed back corresponding fault information to the host computer, and wait for the worker to confirm whether to continue operating.

The present invention can clean sea creatures in tunnels in place of manual work, and solves the problems of low manual cleaning efficiency and high labor strength. Compared with the traditional manual operation method, the present invention effectively avoids the risk generated when the worker enters the tunnel for operation, improves the cleaning efficiency, reduces the cleaning time, and enables a nuclear power plant unit to be put into normal use as early as possible. The present invention has a great application prospect, and has a great significance to the improvement the economic benefit of a power grid. The present invention improves the cleaning efficiency and the cleaning speed. The crawler wheel is used as a drive, such that the robot can effectively move forward and backward in the tunnel, and the entire device does not have the phenomena affecting the normal operation, such as slipping and the like, thereby having a more flexible movement, more convenient control, and high reliability. A plurality of crawler wheels are used. Therefore, the robot is more flexible to control, and can flexibly making a turn and climb a slope in various complex environments. The cutters 108 are mounted on the frame 7 in a 360-degree manner. The advantage thereof is that the cutters can fully cover the cross section of the intake tunnel for cleaning, thereby realizing annular cutting, and significantly improving the cleaning efficiency. In the present invention, the hydraulic cylinders are designed to drive the cutters 108 to move, and can control the cutters 108 to move back and forth to improve the cleaning efficiency. Furthermore, the ends the cutters 108 are saw-toothed, and therefore the cutters can simulate a manual operation manner to move back and forth for cutting, thereby having a better cleaning effect. The present invention structurally uses a detachable module assembly design. The robot is simple and quick to mount and use, and can be transported and mounted in the tunnel, thereby having a high disassembly efficiency, and avoiding delaying the cleaning period due to transportation and disassembly difficulties.

The descriptions above are only the preferred embodiments of the present invention, but are not intended to limit the present invention. For a person skilled in the art, the present invention may have various changes and variations. Any amendments, equivalent substitutions, improvements and the like made within the spirit and, of the present invention are all intended to be concluded in the scope of protection of the present invention.

What is claimed is:

1. A sea creature cleaning robot for an intake tunnel for a nuclear power plant, comprising:
    a plurality of annular frames with a diameter less than a diameter of a tunnel concrete pipe to be cleaned,
    a plurality of cutter assemblies each comprising a plurality of cutter assembly units, wherein each of the cutter assembly units are capable of moving up and down in a radial direction of a respective annular frame of the plurality of annular frames, wherein each of the plurality of cutter assemblies are detachably and uniformly mounted on an outer circumferential surface of each respective annular frame, and
    a plurality of walking wheel assemblies each comprising a plurality of walking wheel assembly units, wherein each of the plurality of walking wheel assemblies are detachably and uniformly mounted at a lower part of each respective annular frame;
        wherein each cutter assembly unit comprises a frame connecting plate, a cutter mounting plate, and a cutter;
        each cutter assembly unit is connected to the outer circumferential surface of each respective annular frame by the frame connecting plate;
        for each cutter assembly unit, the cutter mounting plate and the frame connecting plate are disposed in parallel and are movably connected by means of a plurality of connecting rods,
        two ends of a lifting hydraulic cylinder are respectively connected to the cutter mounting plate and the frame connecting plate,
        the cutter is mounted on one side of the cutter mounting plate distal from the frame connecting plate,
        a guide rail is connected on one side of the cutter mounting plate distal from the frame connecting plate,
        a slide block capable of sliding on the guide rail is connected on one side of the cutter,
        one end of the cutter distal from a cutting edge is connected to the cutter mounting plate by means of a telescopic hydraulic cylinder;
    each walking wheel assembly unit comprises a crawler wheel mounting block, a motor, and a crawler wheel;
        the crawler wheel mounting block of each walking wheel assembly unit is connected to an inner circumferential surface of the respective annular frame by means of a crawler wheel connecting plate;
        for each walking wheel assembly unit, a motor mounting seat is connected to the crawler wheel mounting block, the motor is mounted at a bottom of the motor mounting seat,
        a rotary shaft of the motor is disposed perpendicular to an axial direction and a radial direction of the respective annular frame simultaneously, and directly drives the crawler wheel;
    each of the plurality of cutter assemblies are disposed on respective annular frames in the same manner, and each of the walking wheel assemblies are disposed on respective annular frames in the same manner, wherein adjacent annular frames are coaxially disposed and are detachably connected together, and cutter assemblies disposed on adjacent annular frames are staggered.

2. The sea creature cleaning robot for the intake tunnel for the nuclear power plant according to claim 1, further comprising at least two walking wheel assemblies detachably mounted at an upper part of each respective annular frame.

3. The sea creature cleaning robot for the intake tunnel for the nuclear power plant according to claim 1, wherein for each walking wheel assembly unit, a second motor at the bottom of the motor mounting seat is added; and the two motors are disposed back to back, and respectively drive one crawler wheel.

4. The sea creature cleaning robot for the intake tunnel for the nuclear power plant according to claim 1, wherein for each walking wheel assembly unit, the motor mounting seat and the crawler wheel mounting block are connected by means of a cushion cylinder; a guide block disposed in parallel with an extension and retraction direction of the cushion cylinder is mounted on an inner wall of the crawler wheel mounting block; and a guide groove for use in cooperation with the guide block is mounted on an outer wall of the motor.

5. The sea creature cleaning robot for the intake tunnel for the nuclear power plant according to claim 1, wherein each annular frame comprises a plurality of arc-shaped frame sub-modules sequentially assembled and connected together to form an annular structure.

6. The sea creature cleaning robot for the intake tunnel for the nuclear power plant according to claim 1, wherein for each cutter assembly unit, a cutting edge end of the cutter is saw-toothed, and the cutting edge end slantwise extends out in a direction distal from the cutter mounting plate.

* * * * *